US010459236B2

(12) United States Patent
Lee et al.

(10) Patent No.: US 10,459,236 B2
(45) Date of Patent: Oct. 29, 2019

(54) HEAD-MOUNTED DISPLAY DEVICE WITH EARBUD HOLDER

(71) Applicant: LG ELECTRONICS INC., Seoul (KR)

(72) Inventors: Haklim Lee, Seoul (KR); Sanghyuk Im, Seoul (KR); Jongbeom Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 15/835,243

(22) Filed: Dec. 7, 2017

(65) Prior Publication Data

US 2018/0164594 A1 Jun. 14, 2018

Related U.S. Application Data

(60) Provisional application No. 62/431,827, filed on Dec. 9, 2016.

(30) Foreign Application Priority Data

Nov. 13, 2017 (KR) ........................ 10-2017-0150640

(51) Int. Cl.
*G02B 27/01* (2006.01)
*G06F 3/01* (2006.01)
*H04N 13/332* (2018.01)

(52) U.S. Cl.
CPC ....... *G02B 27/0176* (2013.01); *G02B 27/017* (2013.01); *G06F 3/011* (2013.01);
(Continued)

(58) Field of Classification Search
CPC .............. G02B 27/0176; G02B 27/017; G02B 2027/0152; G02B 2027/015; G02B 2027/0154; G02B 2027/0161; G06F 3/016; G06F 3/162; G06F 3/165; G06F 3/167; G06F 3/011; G06F 3/012; G06F 3/013;
(Continued)

(56) References Cited

U.S. PATENT DOCUMENTS 6,157,291 A * 12/2000 Kuenster ............ G02B 27/0172 345/8
6,215,460 B1 * 4/2001 Mizoguchi ......... G02B 27/0172 345/7

(Continued)

FOREIGN PATENT DOCUMENTS

CN 105898067 A * 8/2016

*Primary Examiner* — Darlene M Ritchie
(74) *Attorney, Agent, or Firm* — Lee, Hong, Degerman, Kang & Waimey

(57) ABSTRACT

A head-mounted display device includes a main body including an opening formed in a rear surface thereof, a band part connected to the main body and fixing the main body to a head of a user, an image output unit disposed inside the main body to face the opening and configured to provide an image to the user, an earbud holder partially depressed into the main body and positioned at a corner between a side surface and a bottom surface of the main body, an earbud mounted on the earbud holder, and a controller configured to control the image output unit and the earbud. The head-mounted display device may be integrated with the audio output unit, thereby improving portability.

16 Claims, 13 Drawing Sheets

(52) U.S. Cl.
CPC .......... *G02B 2027/015* (2013.01); *G02B 2027/0152* (2013.01); *G02B 2027/0154* (2013.01); *G02B 2027/0161* (2013.01); *H04N 13/332* (2018.05)

(58) Field of Classification Search
CPC ... H04N 13/332; H04N 13/344; H04N 13/385
See application file for complete search history.

(56) References Cited

U.S. PATENT DOCUMENTS

| | | | | |
|---|---|---|---|---|
| 6,351,252 B1* | 2/2002 | Atsumi | G02B 27/0176 | 345/8 |
| 6,359,602 B1* | 3/2002 | Amafuji | G02B 27/0172 | 345/8 |
| 6,421,031 B1* | 7/2002 | Ronzani | G02B 27/017 | 345/8 |
| 6,762,885 B1* | 7/2004 | Ogasawara | G02B 27/0176 | 345/8 |
| 6,914,583 B1* | 7/2005 | Chigira | G02B 27/0176 | 345/7 |
| 7,150,526 B2* | 12/2006 | Jannard | G02B 27/0176 | 351/158 |
| 9,733,482 B2* | 8/2017 | West | G02B 27/0176 | |
| 2002/0005819 A1* | 1/2002 | Ronzani | G02B 27/017 | 345/8 |
| 2003/0090439 A1* | 5/2003 | Spitzer | G02B 27/0172 | 345/8 |
| 2005/0168824 A1* | 8/2005 | Travers | G02B 27/0176 | 359/630 |
| 2006/0132382 A1* | 6/2006 | Jannard | G02C 11/06 | 345/8 |
| 2006/0285677 A1* | 12/2006 | Souma | H04M 1/6058 | 379/388.03 |
| 2007/0263893 A1* | 11/2007 | Kim | H04M 1/03 | 381/334 |
| 2008/0144264 A1* | 6/2008 | Cosgrove | G02B 27/017 | 361/600 |
| 2008/0291277 A1* | 11/2008 | Jacobsen | G02B 27/0172 | 348/158 |
| 2009/0180194 A1* | 7/2009 | Yamaguchi | G02B 27/0172 | 359/630 |
| 2009/0243964 A1* | 10/2009 | Rottenkolber | G02B 27/0176 | 345/8 |
| 2011/0273662 A1* | 11/2011 | Hwang | G02B 27/0176 | 351/158 |
| 2012/0105740 A1* | 5/2012 | Jannard | G02C 9/04 | 348/794 |
| 2013/0250503 A1* | 9/2013 | Olsson | G02C 5/12 | 361/679.03 |
| 2013/0258270 A1* | 10/2013 | Cazalet | G02C 11/10 | 351/114 |
| 2013/0259246 A1* | 10/2013 | Kang | H04R 29/001 | 381/59 |
| 2015/0035727 A1* | 2/2015 | Kobayashi | G09G 3/003 | 345/8 |
| 2016/0070110 A1* | 3/2016 | Ushakov | G08C 17/02 | 348/373 |
| 2016/0246367 A1* | 8/2016 | Tungare | A61F 4/00 | |
| 2016/0249124 A1* | 8/2016 | Drinkwater | G06F 1/1605 | |
| 2016/0259986 A1* | 9/2016 | Yun | G06K 9/00892 | |
| 2016/0277797 A1* | 9/2016 | Zhao | H04N 21/4627 | |
| 2016/0313790 A1* | 10/2016 | Clement | G06F 3/011 | |
| 2017/0075120 A1* | 3/2017 | Wong | G02B 27/0172 | |
| 2017/0090201 A1* | 3/2017 | Guo | G02B 27/0176 | |
| 2017/0227779 A1* | 8/2017 | Kato | G02B 27/02 | |
| 2017/0235148 A1* | 8/2017 | Kamakura | G02B 27/0176 | 359/630 |
| 2017/0242262 A1* | 8/2017 | Fuchs | H04N 13/344 | |
| 2017/0277254 A1* | 9/2017 | Osman | G06F 3/167 | |
| 2017/0364144 A1* | 12/2017 | Petrov | G06F 3/012 | |
| 2018/0017786 A1* | 1/2018 | Kamakura | G02B 27/0006 | |
| 2018/0136891 A1* | 5/2018 | Yang | G06F 3/03547 | |
| 2018/0203240 A1* | 7/2018 | Jones | G02C 5/20 | |
| 2018/0279086 A1* | 9/2018 | Bradley | G06F 1/1694 | |

* cited by examiner

FIG. 6
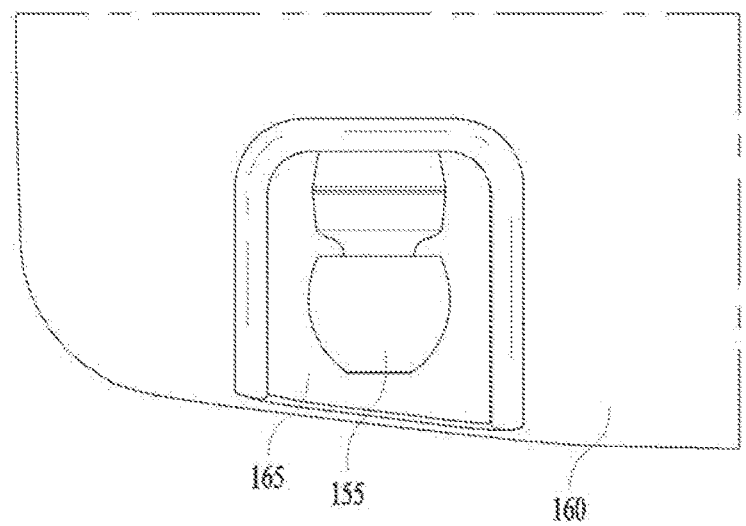
(a)
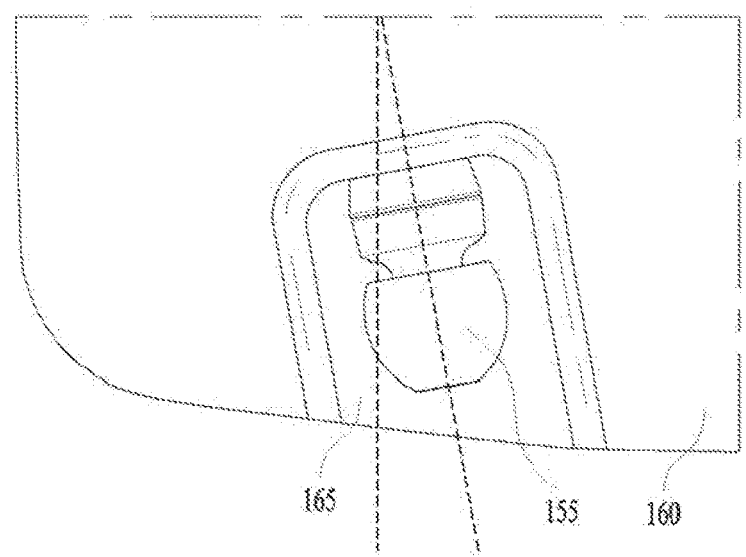
(b)

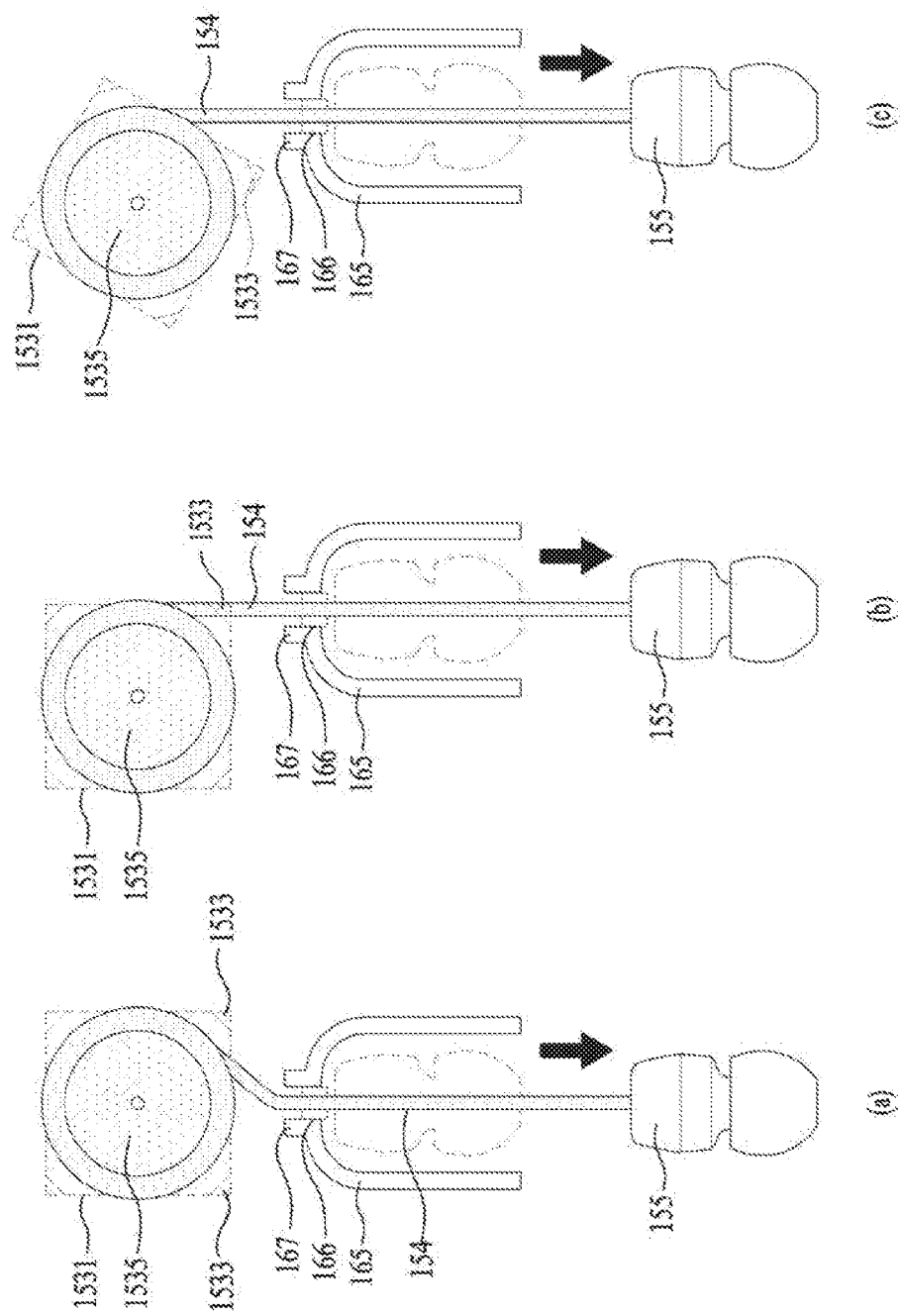

FIG. 9

|  | First sensor ON | | First sensor OFF | |
| --- | --- | --- | --- | --- |
|  | Second sensor ON | Second sensor OFF | Second sensor ON | Second sensor OFF |
| During image reproduction | Continuing to reproduce images | Stopping image reproduction and outputting notification for guiding storage of earbud | Stopping image reproduction and outputting notification for guiding position of earbud | Stopping image reproduction |
| Image OFF | Starting image reproduction | Outputting notification for guiding storage of earbud | Outputting notification for guiding position of earbud | Power OFF |

FIG. 10
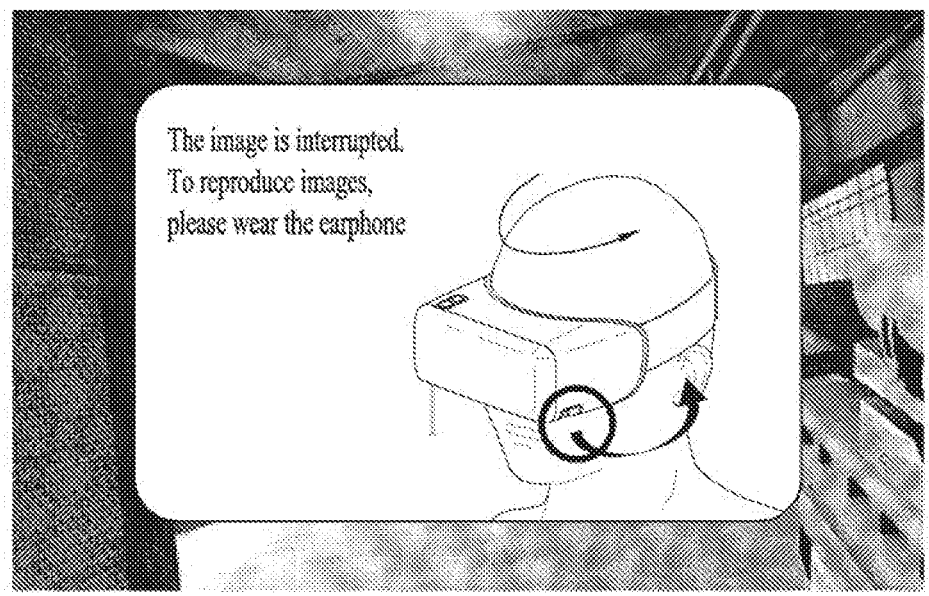
(a)
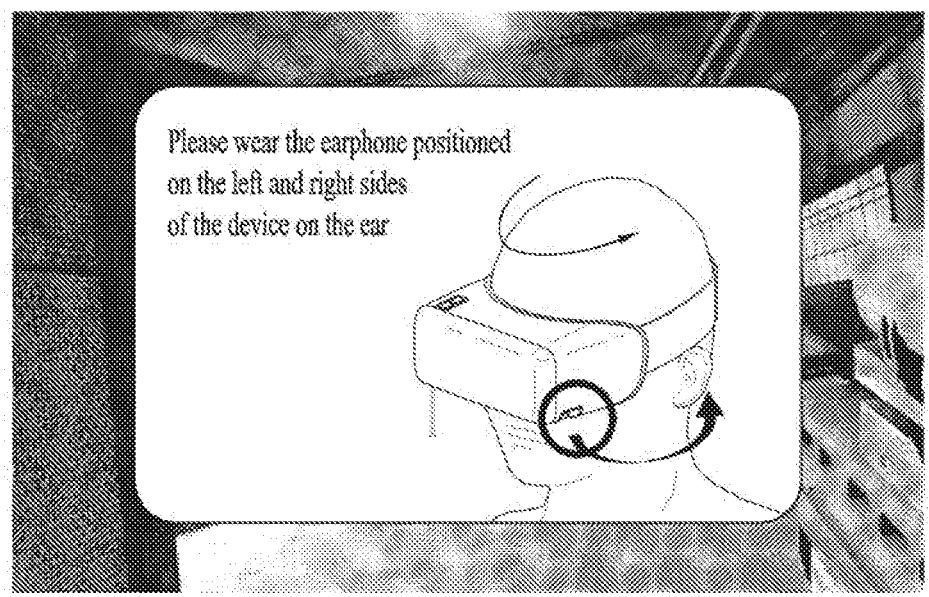
(b)

FIG. 11
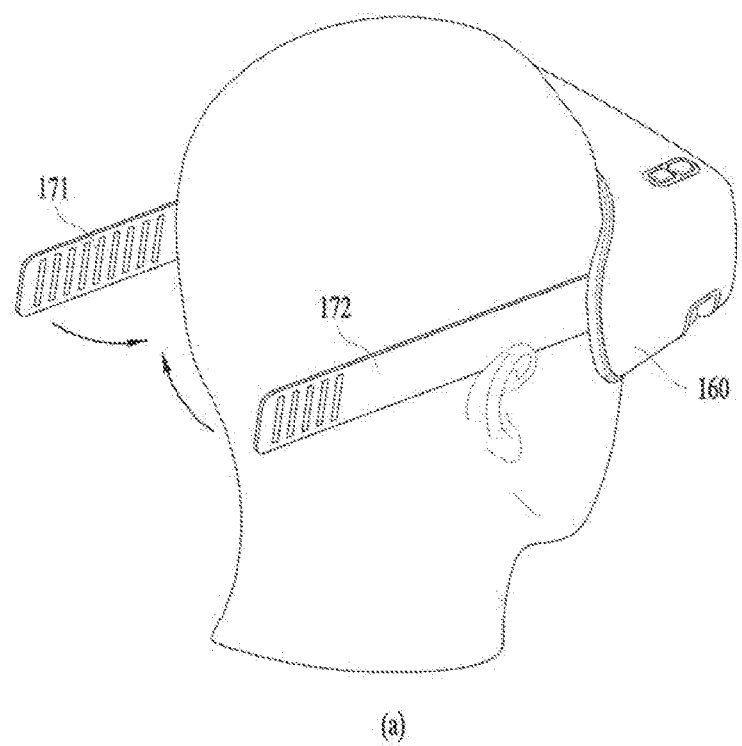
(a)
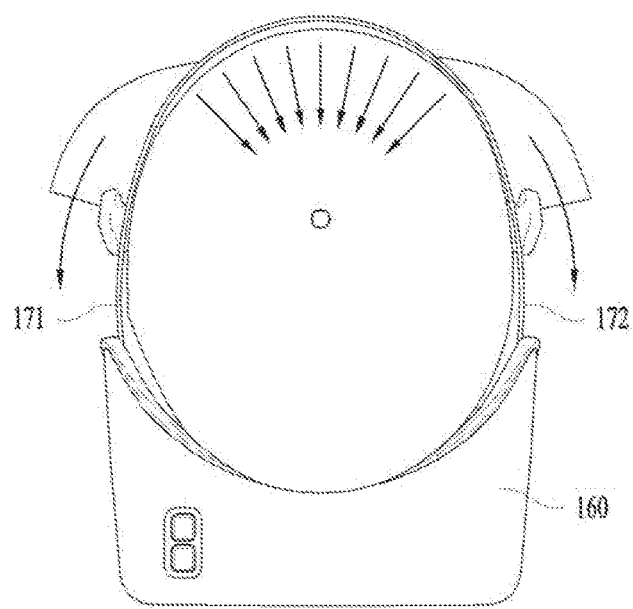
(b)

FIG. 12
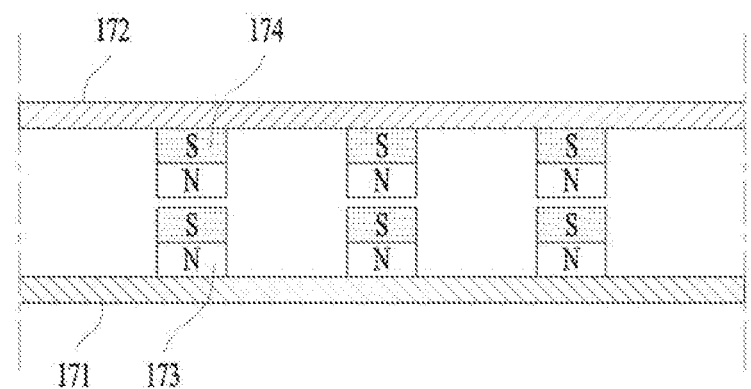
(a)
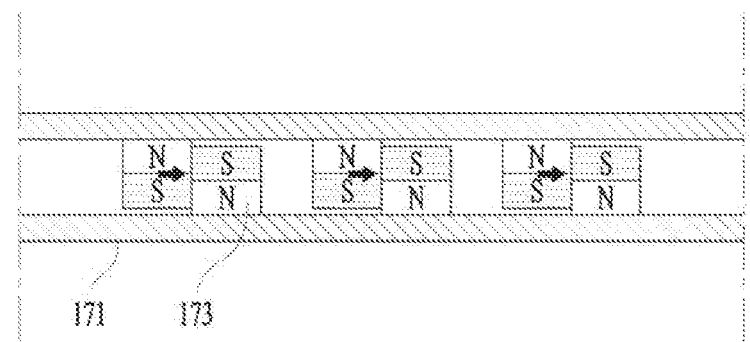
(b)

FIG. 13
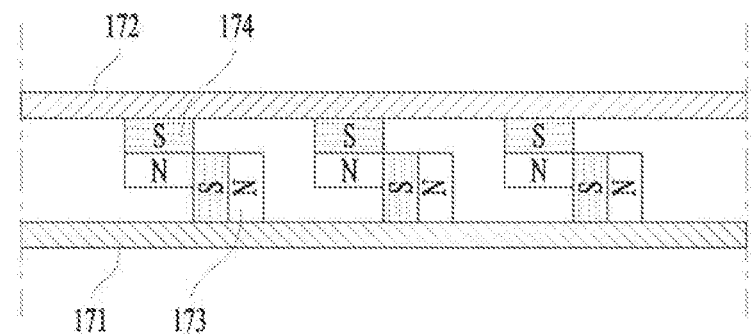
(a)
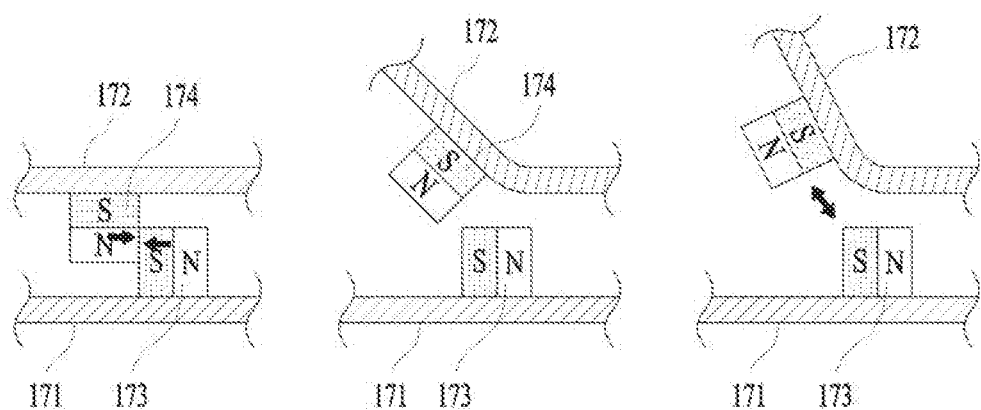
(b)

HEAD-MOUNTED DISPLAY DEVICE WITH EARBUD HOLDER

Pursuant to 35 U.S.C. § 119, this application claims the benefit of U.S. Provisional Application No. 62/431,827, filed on Dec. 9, 2016, and also claims the benefit of earlier filing date and right of priority to Korean Patent Application No. 10-2017-0150640, filed on Nov. 13, 2017, the contents of which are all hereby incorporated by reference herein in their entirety.

BACKGROUND OF THE DISCLOSURE

Field of the Disclosure

The present disclosure relates to a head-mounted display device that transmits virtual reality information with increased usability.

Discussion of the Related Art

Terminals may be divided into mobile/portable terminals and stationary terminals according to whether the terminals are movable or not. The mobile/portable terminals may be divided into handheld terminals and vehicle mounted terminals according to whether the terminals can be carried directly by the user.

The functions of mobile terminals have been diversified. For example, the functions include data and voice communication, photographing and video shooting through a camera, voice recording, music file playback through a speaker system, and outputting an image or video to an image output unit. Some terminals are equipped with an electronic gaming function or multimedia player function. In particular, recent mobile terminals are capable of receiving multicast signals for providing visual content such as broadcast and video or television programs.

In recent years, attention has been focused on wearable devices, and research is actively conducted on various portable terminals wearable on clothes as well as glasses, bracelets and watches.

Among such wearable devices, a head-mounted display device, which is worn on a use's face to provide visual information, is attracting attention as various applications using virtual reality are developed.

A head-mounted display is provided with an image output unit, various sensors for sensing movement of the user, a fixing structure for stably fixing the head-mounted display on the user's head, and the like. In order to realize virtual reality, not only the display but also sound should be considered. Accordingly, an audio output unit is mounted on the head-mounted display.

When the audio output unit is provided, it is usually arranged at one place because of its large volume and weight, which degrade portability. When the audio output unit is separately provided, inconvenience is caused as a separate earphone or headset should be carried. Therefore, there is a need for a head-mounted display device equipped with an audio output unit that does not increase the size of the display device.

SUMMARY OF THE DISCLOSURE

Accordingly, the present disclosure is directed to a head-mounted display device that substantially obviates one or more problems due to limitations and disadvantages of the related art.

An object of the present disclosure is to provide a head-mounted display having an audio output unit that may be stored in a main body and carried without increasing the size of the main body.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a head-mounted display device includes a main body including an opening formed in a rear surface thereof, a band part connected to the main body and fixing the main body to a head of a user, an image output unit disposed inside the main body to face the opening and configured to provide an image to the user, an earbud holder partially depressed into the main body and positioned at a corner between a side surface and a bottom surface of the main body, an earbud mounted on the earbud holder, and a controller configured to control the image output unit and the earbud.

The head-mounted display device may further include a first sensor configured to switch to an OFF state when the earbud is stored in the earbud holder and switch to an ON state when the earbud holder is removed from the earbud, wherein the controller may output sound through the earbud when the first sensor is in the ON state.

The head-mounted display device may further include a speaker mounted on the main body, wherein the controller may output sound through the speaker when the first sensor is in the OFF state.

The head-mounted display device may further include a second sensor configured to switch to the ON state when the main body is worn by the user on the rear surface thereof, wherein, when the first sensor is in the OFF state and the second sensor is in the ON state, the controller may control the image output unit to output an image for guiding a storage position of the earbud.

When the first sensor switches to the ON state, the controller may control the image output unit to output the image.

When the first sensor switches from the ON state to the OFF state while the image output unit is outputting the image, the controller may stop outputting the image.

When the image output to the image output unit is completed, a notification indicating that the earbud should be stored in the earbud holder may be provided to the user.

The earbud holder may have an inner side surface located on a rear side with respect to the earbud and extending downward so as to be inclined toward the rear surface.

The head-mounted display device may further include an audio cable having one end connected to the earbud and an opposite end disposed inside the main body through a cable hole formed in the earbud holder, and a rotary module mounted inside the main body, the audio cable being wound on the rotary module.

The rotary module may include a cylindrical rotary part allowing the audio cable to be wound or unwound around or from an outer circumferential surface thereof according to a rotation direction, and a fixing unit including a rotating shaft arranged through the rotary part, the fixing unit being fixed to the main body, wherein the cable hole and a side surface of the rotary part may be aligned on a straight line in a vertical direction.

An extension direction of the audio cable extending through the cable hole may be coincident with an extension direction of a portion of the audio cable extending from the rotary part to the cable hole.

The fixing unit may include a first fixing part positioned on one surface of the rotary part, a second fixing part positioned on an opposite surface of the rotary part, and a plurality of third fixing parts connecting the first fixing unit and the second fixing unit and spaced apart from a lateral surface of the rotary part, wherein the third fixing parts may not be positioned on a straight line between the rotary part and the cable hole.

The head-mounted display device may include a pair of openings formed at the corner between the side surface and bottom surface of the main body, wherein the earbud holder may be inserted into the pair of openings to cover the pair of openings, and include a data hole formed in the earbud holder, and a data cable for connecting an external terminal and the controller through the data hole.

In another aspect of the present disclosure, a head-mounted display device includes a main body including an opening formed in a rear surface thereof, a first band and a second band connected to one end and an opposite end of the main body, respectively, and having ends fastened to each other to surround the head of the user, an image output unit disposed inside the main body to face the opening and configured to provide an image to the user, and a controller configured to control the image output unit.

The first band may include a plurality of first magnets arranged at the end thereof side by side along a longitudinal direction, wherein the second band may include a plurality of second magnets arranged at the end thereof side by side along the longitudinal direction, wherein the first band and the second band may be arranged to be fastened to each other such that a first pole of the first magnets and a second pole of the second magnets face each other, wherein the main body, the first band, and the second band may form a closed loop.

When the first band in the second band overlap each other, a side surface of each of the first magnets may closely contact a side surface of a corresponding one of the second magnets.

The first magnets may be disposed such that the first pole faces in a direction opposite to the end of the first band, wherein the second magnets may be disposed such that the second pole is oriented in a direction in which the second pole does not face the second band.

A length of a first area having the first magnets in the first band may be greater than a length of a second area having the second magnets in the second band.

Both ends of the main body may include a light shielding part protruding backward and positioned on left and right sides of a face of the user, wherein an upper portion of the rear surface of the main body may be curved to have a first curvature, wherein a lower portion of the rear surface of the main body may be curved to have a second curvature.

The head-mounted display device of the present disclosure may be integrated with the audio output unit, thereby improving portability. In addition, even if the audio output unit is provided, increase in size and weight may be minimized, and thus inconvenience caused by pressing the nose or the cheek when the head-mounted display device is worn may be addressed.

In addition, for the head-mounted display device according to the present disclosure, whether or not the user is wearing the audio output unit may be determined according to whether the audio output unit is stored in the main body, and the head-mounted display device may be controlled based on the determination. Accordingly, user convenience may be enhanced.

In addition, as the size of the headband is adjustable according to the size or shape of the user's head, and the head-mounted display device is brought into close contact with the user's face, external light may be prevented from infiltrating into the device to disturb appreciation of images. Thereby, usability may be improved.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 6 is a side view illustrating an earbud stored in an earbud holder according to the present disclosure;

FIG. 8 is a view illustrating arrangement of an ear bud, an earbud holder and a rotary module according to the present disclosure;

FIG. 9 is a table for explaining a method of controlling a head-mounted display device according to whether a first sensor and a second sensor are turned on or off;

FIG. 10 illustrates screen images output to an image output unit according to whether the first sensor and the second sensor of the present disclosure are turned on or off.

FIG. 11 illustrates how a user should wear a head-mounted display device according to the present disclosure; and FIGS. 12 and 13 illustrate embodiments of first magnets positioned in a first band and second magnets positioned in a second band of the present disclosure.

DETAILED DESCRIPTION OF THE DISCLOSURE

Figure 1:
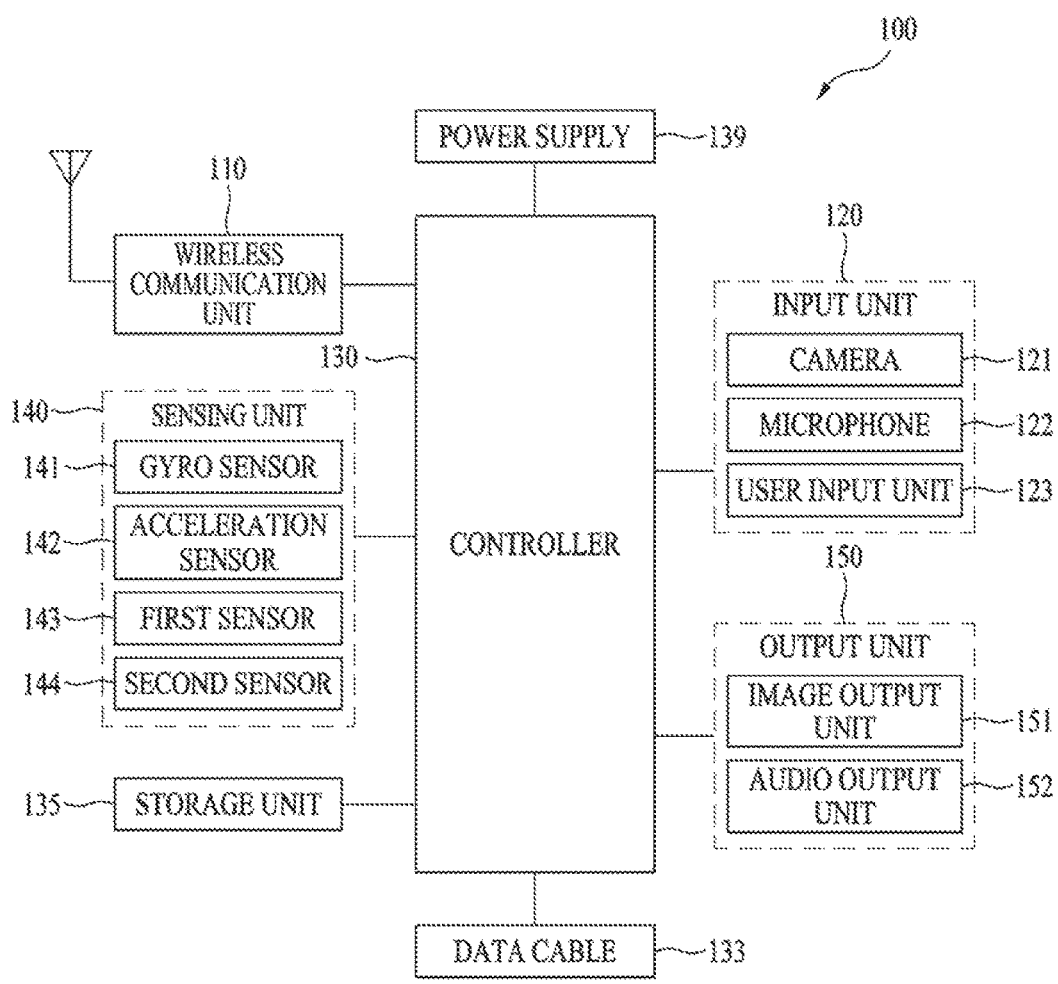
FIG. 1 is a block diagram illustrating a head-mounted display device related to the present disclosure.

Hereinafter, a head-mounted display device 100 related to the present disclosure will be described in detail with reference to the accompanying drawings. In general, a suffix such as "module" and "unit" may be used to refer to elements or components. Use of such a suffix herein is merely intended to facilitate description of the specification, and the suffix itself is not intended to give any special meaning or function.

In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Conventionally, mobile terminals are based on a phone call function. However, in recent years, even portable devices having various multimedia functions in addition to the phone call function are all called mobile terminals. The mobile terminals are not just held by hand. They may be extended even to wearable devices that can be worn on physical bodies. Such wearable devices include a smart watch, smart glasses, and a head-mounted display device.

The head-mounted display device 100 is an imaging device to be worn on the head of a user, and is an essential device for realizing virtual reality by visually blocking the view of the outside and providing an image that looks like a real view.

The head-mounted display device 100 may be capable of interchanging data with (or being operatively connected to) other mobile terminals. A short-range communication module may sense (or recognize) the head mounted display device 100 positioned around a mobile terminal and capable of communicating with the mobile terminal. Further, when the sensed head-mounted display device 100 is a device authenticated to communicate with the mobile terminal, a controller may transmit at least a part of the data processed in the mobile terminal to the head-mounted display device 100 via the short-range communication module. Accordingly, the data processed in the mobile terminal is available to the user through the head-mounted display device 100. For example, when a phone call is received by the mobile terminal, talking may be performed through the head-mounted display device 100. When a message is received by the mobile terminal, the received message may be checked through the head-mounted display device 100.

FIG. 1 is a block diagram of a head-mounted display device 100 according to an embodiment of the present disclosure. The head-mounted display device 100 may include a wireless communication unit 110, an input unit 120, a sensing unit 140, an output unit 150, a storage unit 135, a controller 130, and a power supply 139. The elements shown in FIG. 1 are not essential, and a head-mounted display device 100 having more or fewer elements may be implemented.

Hereinafter, the elements will be described in order.

The wireless communication unit 110 may include one or more modules enabling wireless communication between the head mounted display apparatus 100 and a wireless communication system or between the head mounted display apparatus 100 and a network in which the head mounted display apparatus 100 is located. For example, the wireless communication unit 110 may include a mobile communication module, a wireless Internet module, a short-range communication module, and a location information module.

The mobile communication module may transmit and receive a wireless signal to and from at least one of a base station, an external terminal, or a server over a mobile communication network such as GSM (Global System for Mobile communications), CDMA (Code Division Multiple Access), or WCDMA (Wideband CDMA), without being limited thereto. The wireless signal may include various types of data according to transmission and reception of a voice call signal, a video call signal, or a text/multimedia message.

The wireless Internet module refers to a module for wireless Internet access, and may be installed inside or outside the head-mounted display device 100. Wireless Internet technologies including WLAN (Wireless LAN) (Wi-Fi), WiBro (Wireless broadband), WiMAX (World Interoperability for Microwave Access), HSDPA (High Speed Downlink Packet Access), GSM, CDMA, WCDMA, and LTE (Long Term Evolution) may be used.

Considering that wireless Internet access by WiBro, HSDPA, GSM, CDMA, WCDMA, LTE or the like is performed over a mobile communication network, the wireless Internet module, which performs wireless Internet access over the mobile communication network, may be understood as a kind of the mobile communication module.

The short-range communication module refers to a module for short-range communication. Short-range communication technologies including Bluetooth, Radio Frequency Identification (RFID), infrared data association (IrDA), Ultra-Wideband (UWB), and ZigBee.

The location information module is a module for acquiring the location of the head-mounted display device 100. A typical example of the location information module is a Global Positioning System (GPS) module. According to the current technology, the GPS module may calculate distance information and accurate time information from three or more satellites, and then apply trigonometry to the calculated information to correctly calculate the current three-dimensional position information according to latitude, longitude, and altitude. At present, a method of calculating location and time information using three satellites and correcting the error of the calculated location and time information using another satellite is widely used. In addition, the GPS module may calculate speed information by continuously calculating the current location in real time.

Referring to FIG. 1, the input unit 120 is provided for inputting an audio signal or a video signal. The input unit 120 may include a camera 121, a microphone 122, a user input unit 123, and a touch sensor.

The camera 121 processes an image frame such as a still image or a moving image captured by the image sensor in the video call mode or the photographing mode. The processed image frame may be stored in the storage unit 135 or may be transmitted to the outside via the wireless communication unit 110. At least two cameras 121 may be provided depending on user environment.

The microphone 122 receives an external sound signal via a microphone in a call mode, a recording mode, a voice recognition mode, or the like, and processes the same into electrical voice data. In the call mode, the processed voice data may be converted into a form that is transmittable to a mobile communication base station via the mobile communication module and then be output. Various noise removal algorithms may be implemented in the microphone 122 to remove noise generated in receiving external sound signals.

When the camera 121 acquires a still image, information may be extracted from the still image. When the camera 121 captures a moving image, the moving image includes a plurality of still images. It may be waste of processes to acquire information on all the still images through an image recognition unit and process the same in the controller. In addition, if unnecessary information is extracted and provided to the user, the user may feel uncomfortable in using the head-mounted display device 100 that is worn like glasses.

The user may extract only necessary information by pressing the user input unit 123 provided to the main body 160 or issuing a voice command to acquire image information. Alternatively, information may be extracted when the user gazes at the same object for more than a certain time, and thus the camera 121 captures the same image for more than a certain time.

Alternatively, when the user comes close to a specific object, and thus the object occupies a large area of the field of view, it may be determined that the corresponding object is watched. Therefore, when one object occupies more than a certain area of the image recognized by the camera 121, information related to the object may be extracted.

Although providing the head-mounted display apparatus 100 with a keyboard is difficult, it may have a button-type user input unit 123 on the main body 160 so as to input frequently used commands. For example, a command to capture an image that the user is viewing, to extract information from an image, or to adjust the volume of sound output from the sound output unit 152 may be specified.

For the user input unit 123, various types of user input units 123 such as a metal dome for generating a signal by recognizing physical pressure and or a touch sensor for recognizing touch of a user's hand may be employed.

The sensing unit 140 may sense the state of the portable terminal 100 and the surrounding environment. Typical examples of the sensing unit 140 may include a gyro sensor 141 and an acceleration sensor 142.

The gyro sensor 141, which is a device configured to sense change in tilt of the portable terminal, detects variations in three orthogonal axes of the x-axis, y-axis, and z-axis. It is also called an angular velocity sensor. The gyro sensor may sense tilting and shaking of the main body of the mobile terminal by sensing momentum of the rotational movement about each axis.

The conventional gyro sensor is formed in the shape of a spin having three axes. However, recently introduced sensors such as optical gyro sensors and vibratory gyro sensors have high precision and a compact size, and are thus mountable on a small electronic product such as a mobile terminal. A six-axis sensor implemented by a MEMS module may also be used as the gyro sensor 141.

The gyro sensor 141 employed in the present disclosure is not limited to the aforementioned types of sensors but includes all sensors capable of sensing the tilt and movement of the head-mounted display device 100.

The acceleration sensor 142 measures dynamic force such as the acceleration of the head-mounted display device 100. It also detects vibration, impact and the like from change in acceleration. When an object having a mass is accelerated, force is generated and change in acceleration according to the magnitude of force is sensed.

The proximity sensor 144 may be disposed on the main body 160 and may sense an object approaching the head-mounted display device. The proximity sensor refers to a sensor that detects presence or absence of an object approaching a predetermined detection surface or a nearby object without mechanical contact, using electromagnetic force or infrared light. Proximity sensors have a longer lifetime and higher utilization than contact sensors.

Examples of the proximity sensors include a transmission type photoelectric sensor, a direct reflection type photoelectric sensor, a mirror reflection type photoelectric sensor, a high frequency oscillation type proximity sensor, a capacitive proximity sensor, a magnetic proximity sensor, and an infrared proximity sensor. If the touchscreen is a capacitive touchscreen, it is configured to detect proximity of the pointer by change in the electric field caused by the proximity of the pointer. In this case, the touchscreen (touch sensor) may be classified as a proximity sensor.

Next, the output unit 150 generates an output related to a visual, auditory or tactile sense. The output unit 150 may include an image output unit 151 and an audio output unit 152.

The image output unit 151 serves to provide images to a user. The image output unit 151 may be integrated with the head-mounted display device 100, or may be implemented using a bar-type mobile terminal (e.g., a smartphone) including a display unit.

The image output unit 151 may provide images to the left and right eyes respectively to provide a stereoscopic image. To this end, the screen of one display unit may be divided for the image output unit 151 to provide an image for the left eye and an image for the right eye, or a pair of display units may be used.

The image output unit 151 may include at least one of a liquid crystal display (LCD), a thin film transistor-liquid crystal display (TFT LCD), an organic light-emitting diode (OLED) display, a flexible display, a three-dimensional (3D) display, or an electronic ink display (e-ink).

The audio output unit 152 may output audio data received from the wireless communication unit 110 or stored in the storage unit 135 in a call signal reception mode, a call mode, a recording mode, a voice recognition mode, a broadcast reception mode, or the like. The sound output unit 152 may also output sound signals (e.g., call signal reception sound, message reception sound, etc.) associated with functions performed in the head mounted display device 100. The audio output unit 152 may include a receiver, a speaker, and a buzzer.

The head-mounted display device 100 may be configured to be worn on the head of a human body to transmit sound in a bone conduction manner. In this method, a vibration module is provided to a part of the head-mounted display device that closely contacts the head in order to transmit sound by vibrating the skull.

The storage unit 135 may store a program for processing and control performed by the controller 130 or may function to temporarily store input/output data. Newly input data may be stored in the storage unit 135, and previously stored data may be extracted from the storage unit 135 and used. The storage unit 135 may extend the storage function using an auxiliary storage device such as an SD card as well as a built-in device.

The controller 130 typically controls the overall operation of the head-mounted display device 100. The controller may provide information to a user by controlling the wireless communication unit 110 to transmit/receive various signals, by processing input data, or by controlling the image output unit 151 and the audio output unit 152.

The controller 130 of the present disclosure may extract information from the image acquired by the camera 121 and compare the extracted information with pre-stored information, store the extracted information in the storage unit 135, extract related information stored in the storage unit 135 output the same to the image output unit 151, or search for the related information on the Internet.

The power supply 139 receives external power and internal power under control of the controller 130 and supplies the power required for operation of the respective elements. The power supply 139 may include, for example, a battery, a connection port, a power supply, a controller, and a charging monitoring unit.

The various embodiments described herein may be implemented on a recording medium readable by a computer or similar device using, for example, software, hardware, or a combination thereof.

Figure 2:
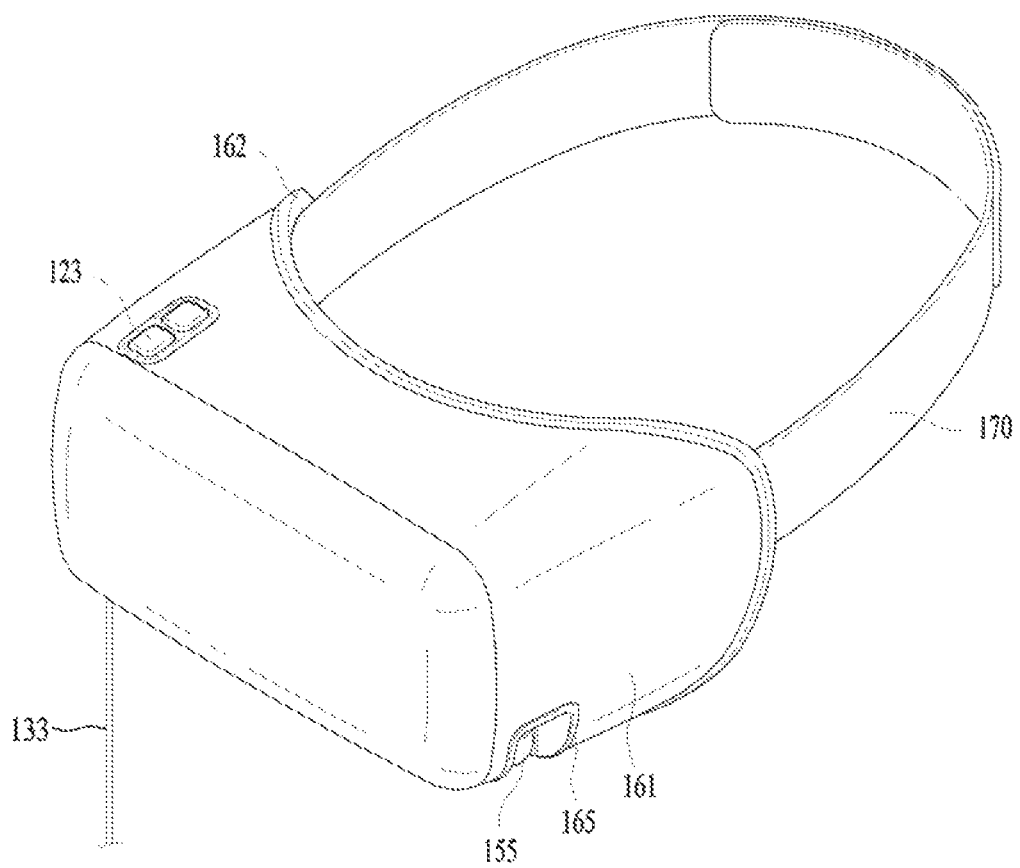
FIG. 2 is a perspective view illustrating a head-mounted display device related to the present disclosure.
Figure 3:
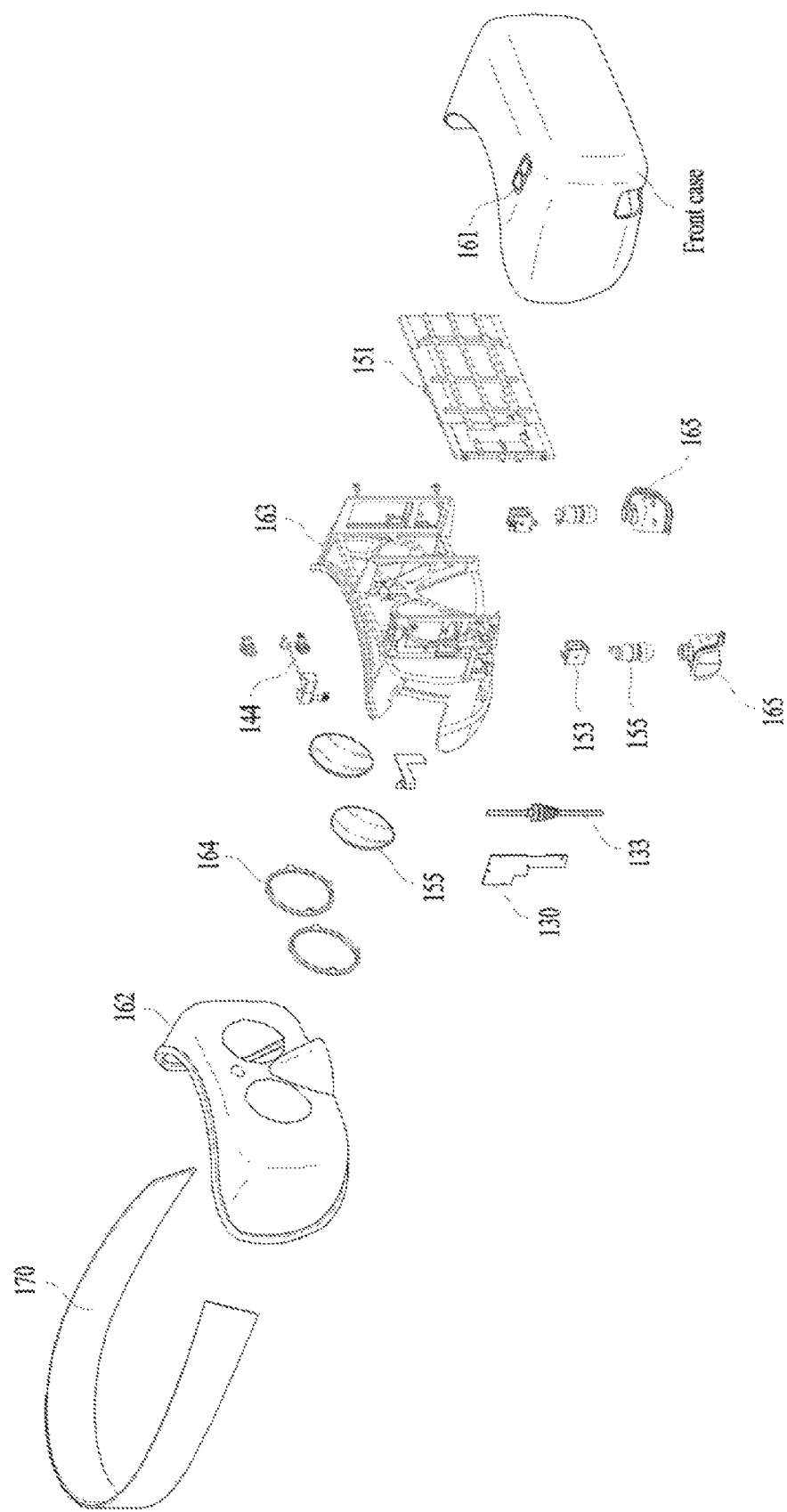
FIG. 3 is an exploded perspective view of a head-mounted display device related to the present disclosure.
Figure 4:
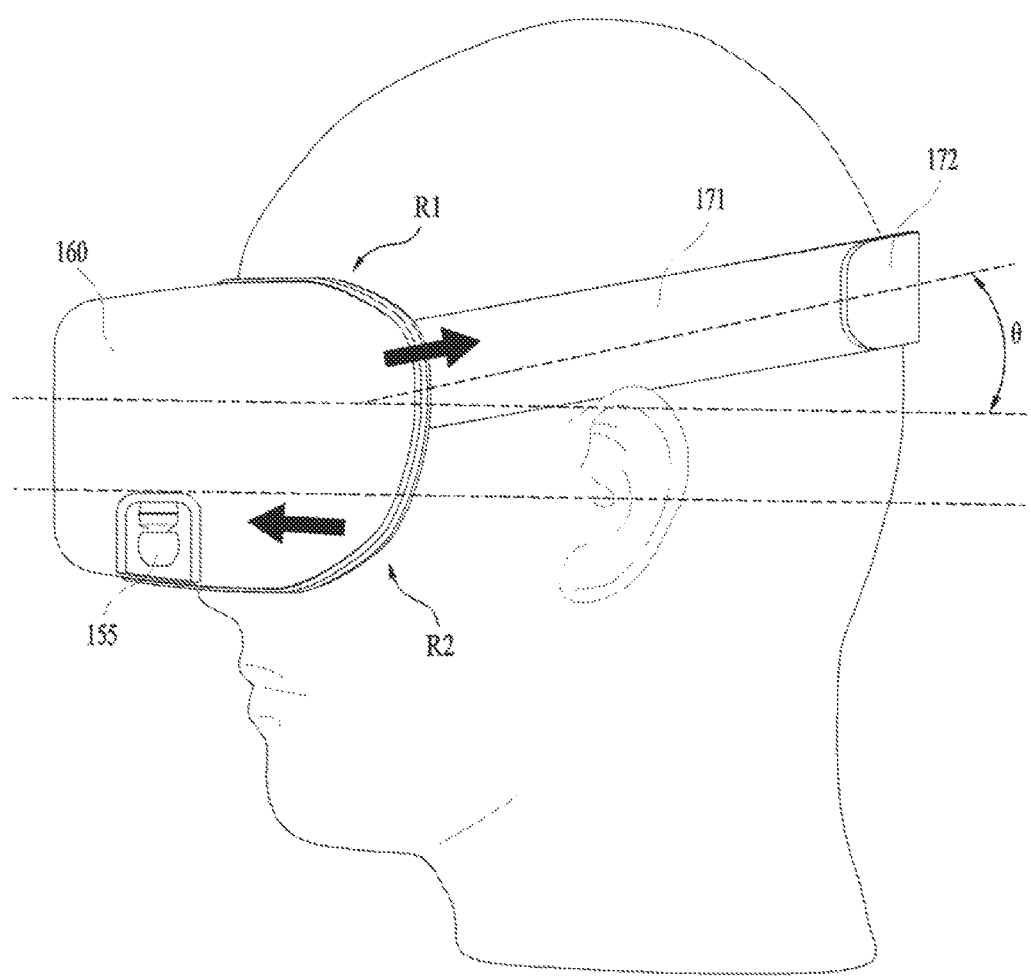
FIG. 4 is a side view illustrating a head-mounted display device related to the present disclosure that is worn by a user.

FIG. 2 is a perspective view illustrating the head-mounted display device 100 related to the present disclosure, and FIG. 3 is an exploded perspective view of a head-mounted display device 100 related to the present disclosure. FIG. 4 is a side view illustrating a head-mounted display device 100 related to the present disclosure that is worn by a user.

The head-mounted display device 100 includes a main body 160 that includes the image output unit 151, the sensing unit 140 and the controller 130 and is disposed in front of the user's eyes, and a band part 170 for fixing the main body 160 to the user's head. For simplicity, a portion of the head-mounted display device 100 that contacts the user's face when the user wears the head-mounted display device 100 is referred to as the back (rear surface), and a direction of the user's gaze is referred to as the forward direction (front).

When a display device such as a smartphone is mounted and used, the image output unit 151 mounted on the main body 160 may include a mounting portion for mounting the smartphone or the like. In the case of a built-in image output unit 151, the image output unit 151 is directly provided in the main body 160.

Since the main body 160 closely contacts the user's face and is provided with an image output from the image output unit 151 with infiltration of external light obstructed, the portion contacting the face may have a curved surface according to the face profile of the user as shown in FIG. 2. Silicone or a cushioning material is interposed between the face and the portion contacting the face and is deformable according to the shape or size of the face. Thus, wearability is enhanced. In addition, as external light is prevented from reaching the eyes of the user, images provided through the display unit 151 are not interfered with. In the present disclosure, the housings 161 and 162 constituting the main body 160 and forming the front and rear surfaces may be formed of different materials. In this case, the portion contacting the nose of the user may be formed of a soft material, and thus wearability may be further enhanced.

The main body 160 may further include a light shielding part positioned on the left and right sides of the user's face to completely block infiltration of external light. The light shielding part protrudes rearward from the left and right rear surfaces of the main body 160, and the lower portion thereof overlaps the user's cheek. The cheek portion on the sides of the eyes of the user protrudes outward. Accordingly, to enhance wearability, the upper portion of the end portion of the light shielding part may protrude farther than the lower portion of the end portion, and the lower portion of the end portion may be formed to have a curvature R2 that is smaller than the curvature R1 of the upper portion.

The headband 170 is connected to the main body 160. The main body 160 and the headband 170 form a ring extending from the forehead of the user to the back of the head. The headband is connected in the lateral direction of the main body 160 and extends to the back of the head via the upper portions of the ears of the user. As shown in FIG. 4, a portion of the headband positioned on the back of the head may be located above a portion of the headband connected to the main body 160. That is, the headband 170 is inclined upward at an angle of θ. As the portion of the headband 170 supporting the back of the head is positioned on the upper side, it becomes easier to cancel force tilting the main body 160 downward.

The part of the headband connected to the main body 160 is also located above the main body 160. When the upper part of the main body 160 is fixed, it closely contacts the forehead of the user, and a portion of the main body positioned near the cheek does not closely contact the cheek, and thus the force pressing the cheek is weakened. Since the forehead portion of the face of a person is less sensitive while the cheek portion is sensitive, wearability may be enhanced by lessening pressure applied to the cheek portion and causing the forehead portion to support the weight of the main body 160.

Figure 5:
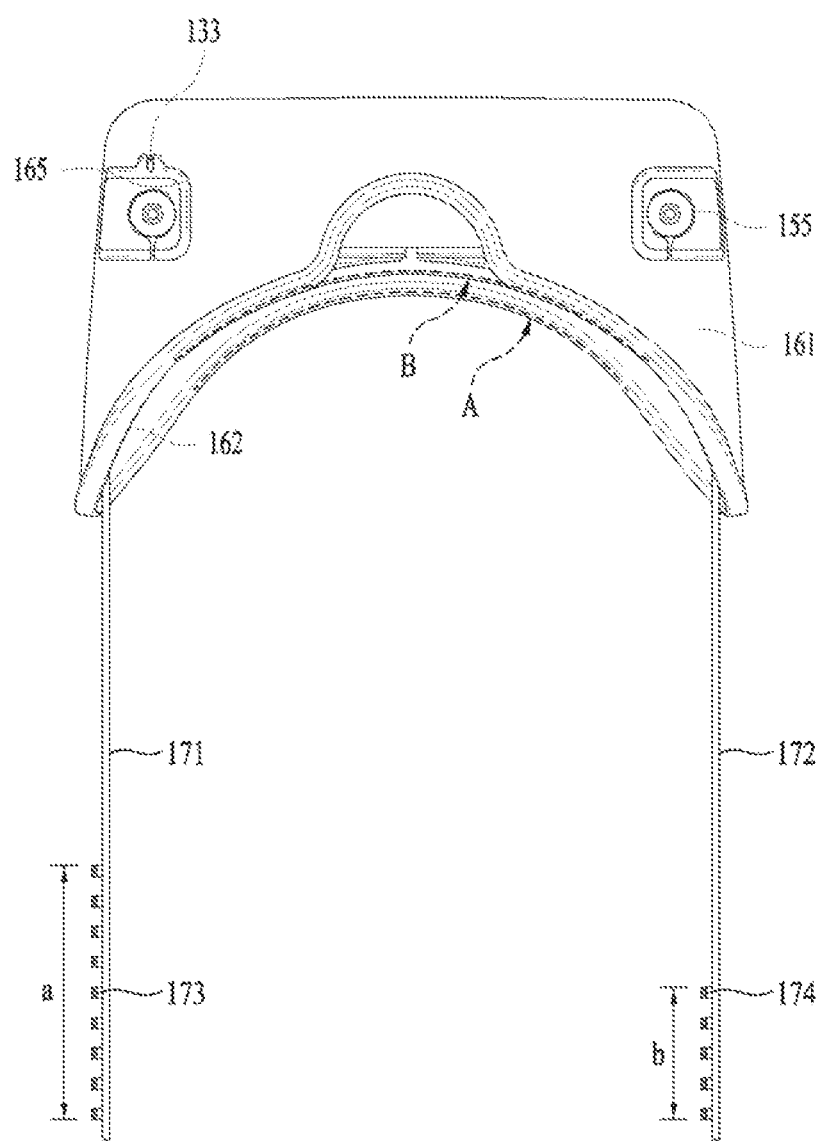
FIG. 5 is a bottom view of the head-mounted display device of the present disclosure viewed from the bottom.

FIG. 5 is a bottom view of the head-mounted display device 100 of the present disclosure viewed from the bottom. The upper portion of the main body 160 protrudes farther rearward than the lower portion of the main body 160, and thus the majority of the weight of the main body 160 is supported by the forehead of the user. Thereby, wearability may be enhanced. The rear part of the main body 160 forms a curved surface according to the shape of the user's face. The upper portion A of the real part has a curvature smaller than that of the lower portion B of the rear part. Thereby, the magnitude of the force applied to the cheek may be relatively reduced.

The head-mounted display apparatus 100 of the present disclosure includes an earbud 155 as the sound output unit 152 for providing sound as well as the display unit for providing images. The main body 160 further includes an earbud holder 165 for accommodating the earbud 155.

The earbud holder 165 may be positioned at the corner between the lower surface and the side surface of the main body 160 such that the user may easily find the earbud holder 165 while the head-mounted display device 100 is worn by the user. Referring to FIG. 4, since the lower surface of the main body 160 is located below the ear hole of the user, and the earbud 155 is separated in a downward direction, the ear tip of an elastic material which is fitted around a sound hole of the earbud holder 165, through which sound is output, may be disposed to face downward.

If the earbuds 155 are positioned to face in the left-right direction and the end portions of the ear tips are oriented in the left-right direction, the sound holes are visible, which may deteriorate the exterior design. FIG. 6 is a side view showing the earbud 155 and earbud holder 165 of the present disclosure. When the user removes the earbud 155 from the earbud holder 165, the user pulls the earbud 155 backward. Therefore, to facilitate removal of the earbud 155 from the earbud holder 165 in the backward direction, the earbud holder 165 may be formed such that the inner surface of the earbud holder 165 located at the rear side of the earbud 155 extends downward so as to be inclined backward.

Only the inner surface located on the rear side may be formed to be inclined as shown in FIG. 6(*a*), or the earbud holder 165 may extend downward such that the whole earbud holder 165 is inclined backward.

The earbud 155 of the present disclosure may wirelessly receive a sound signal from the controller provided in the main body 160, or may be connected to the main body 160 through an audio cable 154. The wireless earbud 155 may use a stronger coupling technique to enhance coupling with the earbud holder 165. For example, a button may be used to fasten and remove the earbud 155 to and from a hook, or coupling may be implemented in a press-fitting manner.

The earbud 155 is connected to the main body 160 through the audio cable 154 in a manner that the audio cable 154 is arranged through a cable hole 166 penetrating the housings of the main body 160, one end of the audio cable 154 is connected to the controller 130, and the other end of the audio cable 154 is connected to the earbud 155. Although the audio cable 154 may be exposed to the outside, a rotary module 153 which may be stored inside the main body 160 may be further provided in consideration of portability and exterior design.

Figure 7:
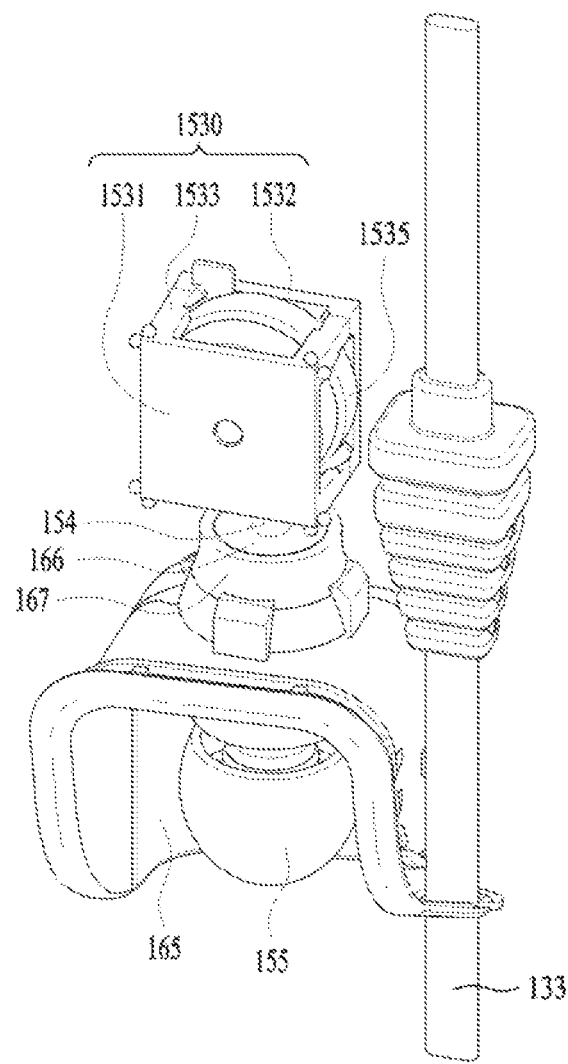
FIG. 7 is a perspective view showing an earbud, an earbud holder, and a rotary module according to the present disclosure.

FIG. 7 is a perspective view showing the earbud 155, the earbud holder 165, and the rotation module 153 of the present disclosure. The earbud holder 165 may have a depressed curved shape corresponding to the shape of the earbud 155 to allow the earbud 155 to be fastened thereto. The earbud holder 165 may include a cable hole 166 through which the audio cable 154 is arranged. To ensure that the audio cable 154 is stably arranged, the hole may include a cable guide 167 protruding toward the rotary module 153 as shown in FIG. 7.

The earbud holder 165 is provided by forming an opening in the housing 161 and fitting a separate member into the opening. The earbud 155 and the rotary module 153 are integrated with each other and coupled to the housing. The data cable 133 may be further arranged through the opening for the earbud holder 165.

The data cable 133 is a cable for transmitting image data and sound data to the head-mounted display device 100. An additional opening is not formed in the housing 161 for the data cable 133. Instead, the data cable 133 may be disposed using the opening for the holder 165. That is, the earbud holder 165 may form a data hole to allow the data cable 133 to be arranged through the data hole (see FIG. 5).

The rotary module 153 may include a fixing unit 1530, which includes a cylindrical rotary part 1535 allowing the audio cable 154 to be wound or unwound around or from the outer circumferential surface thereof according to the rotation direction, and a fixing unit 1530 which includes a rotating shaft arranged through the rotary part 1535 and is fixed to the main body 160. The fixing unit 1530 may include a plate-shaped case located outside the rotary module 153 to cover the top and bottom surfaces of the rotary module 153. Since surrounding the entire lateral surface of the rotary module 153 may increase the size, a plurality of third fixing parts 1533 may be formed and fixed.

The rotary part 1535 of the rotary module 153 may be provided therein with a spirally wound tape spring, which provides rotational force. The rotary part 1535 may include a stopper for preventing the elasticity of the tape spring from rotating the rotatory part 1535 such that the cable 154 that is drawn out remains fixed in the drawn-out position.

As shown in FIG. 7, the fixing unit 1530 includes a first fixing part 1531, a second fixing part 1532, and a third fixing part 1533 connecting the second fixing part 1532 and the rotary part 1535 and located around the side surface of the rotary part 1535, the first fixing part 1531 and the second fixing part 1532 being formed in a quadrangular shape and positioned on one surface and the opposite surface of the rotary part 1535. In the case where the first fixing part 1531 and the second fixing part 1532 are formed in a quadrangular shape, the four corner portions of each of the first and second fixing parts are most spaced apart the rotary part 1535, and therefore the third fixing part to 5033 may be disposed at the corners of the first fixing part 1531 and the second fixing unit 1532.

FIG. 8 is a view a view illustrating arrangement of the earbud 155, the earbud holder 165 and the rotary module 153 of the present disclosure. The audio cable 154 is wound on the outer side of the rotary module 153. When the audio cable 154 is unwound from the rotary part 1535 of the rotary module 153, it is released in the tangential direction of the rotary module 153 since the sound cable 154 is pulled tight.

As shown in FIG. 8(*a*), the rotary module 153 may be disposed such that the center axis of the cable module 166 of the earbud holder 165 and the center axis of the rotary module 153 are aligned with each other. However, in this case, since the tangential direction in which the audio cable 154 is unwound is misaligned with the direction in which the audio cable 154 is passed through the cable hole 166 by the cable guide 167, the audio cable 154 is bent and drawn out. Thereby, the audio cable 154 may be disconnected.

As shown in FIG. 8(*b*), the audio cable 154 may be disposed such the tangential direction is aligned with the cable hole 166. In this case, the audio cable 154 may be caught by the third fixing unit 1533.

Therefore, if the fixing part 1530 is disposed to be obliquely oriented as shown in FIG. 8(*c*), the tangential direction in which the audio cable 154 is unwound may be aligned with the direction in which the audio cable 154 is passed through the audio hole, and the problem that the audio cable 154 is caught by the third fixing part 1533 may be solved.

A first sensor 143 may be included to sense whether the earbud 155 is coupled to the earbud holder 165 or whether the user wears the earbud 155. The first sensor 143 may be a hall sensor for sensing magnetism that is changed by a magnet located in the earbud 155 or may be a switch that is physically pressed when the earbud 155 is stored in the earbud holder 165. If the earbud 155 is stored in the earbud holder 165, it may be determined that the user is not wearing the earbud 155. If the earbud 155 is not stored in the earbud holder 165, it may be determined that the user is wearing the earbud 155.

Alternatively, the first sensor 143 may be located in the earbud 155 to sense the temperature when the user wears the earbud, or to sense the pressure of pressing to determine whether the user is wearing the earbud 155. The first sensor 143 may be turned off when the earbud 155 is stored in the earbud holder 165 and turned on when the earbud 155 is separated from the earbud holder 165, or vice versa.

When the first sensor 143 is turned on, it may be determined that the user has worn the earbud 155, and sound may be reproduced through the earbud 155. When the first sensor 143 is turned off, it may be determined that the user is not wearing the earbud 155, and sound may be output through a separate speaker. If the speaker is not provided, the controller may control reproduction of images output to the image output unit 151 according to the ON/OFF state of the first sensor 143.

The second sensor 144 may be provided on the rear surface of the main body 160, which contacts the user's face, to determine whether or not the user wears the head-mounted display device 100. A typical example of the second sensor 144 may be the proximity sensor.

When the user wears the head-mounted display device, the second sensor 144 may be turned on. When the user does not wear the head-mounted display device, the second sensor 144 may be turned off. The combination of the first sensor 143 and the second sensor 144 may determine whether or not the user wears the head-mounted display device 100 in a usable state. That is, the ON state of the first sensor 143 is a state in which the user is allowed to hear sound, and the ON state of the second sensor 144 is a state in which the user is allowed to see images. Thus, images and sound may be provided. However, if any one of the sensors is turned off, the user cannot see the images or cannot hear sound, accordingly, reproduction of content may be stopped.

FIG. 9 is a table for explaining a method of controlling the head-mounted display device 100 according to whether the first sensor 143 and the second sensor 144 are turned on or off. FIG. 10 illustrates screen images output to an image output unit according to whether the first sensor and the second sensor of the present disclosure are turned on or off. When the first sensor 143 is ON and the second sensor 144 is ON, images being reproduced are continuously reproduced. If both the first sensor 143 and the second sensor 144 are turned on when there is no image reproduced, image reproduction will be started.

If the first sensor 143 is ON and the second sensor 144 is OFF, this means that the user does not wear the head-mounted display device 100, and the earbud 155 is not stored in the earbud holder 165. Thus, image reproduction may be stopped and a notification indicating that the earbud 155 should be stored in the earbud holder 165 may be output. The notification may be issued by outputting a notification sound or a guidance voice through a speaker.

Next, if the first sensor 143 is OFF and the second sensor 144 is ON, this means that the head-mounted display device 100 is worn on the head but the earbud 155 is not worn. Thus, image reproduction for the use is stopped, and a notification for guiding the user to the position of the earbud 155 is output. The notification may be issued by outputting a notification sound or a guidance voice through the speaker or by outputting at least one of an image or a message for guiding the user to the position of the earbud holder 165 such that the user may wear the earbud 155, as shown in FIG. 10(a), since the user is wearing the head-mounted display device 100.

If the first sensor 143 is OFF and the second sensor 144 is ON, while there is no image reproduced, a notification for guiding the user to the position of the earbud 155 may be issued as shown in FIG. 10(b).

If the first sensor 143 is OFF and the second sensor 144 is OFF, it may be determined that the user does not use the had-mounted display device anymore, and thus image reproduction may be stopped and the power may be turned off.

In the case where the speaker is provided, when the first sensor 143 is turned off, sound that is being output through the earbud 155 may be output through the speaker, instead of stopping reproduction of images. In this operation, a notification window allowing the user to select whether or not to output sound through the speaker may be output to the image output unit 151.

As described above, whether the user is wearing the head-mounted display device 100 and the head-mounted display device 100 is ready to be used may be determined based on the ON/OFF states of the first sensor 143 and the second sensor 144. Therefore, the image output unit 151 and the audio output unit 152 of the head-mounted display device 100 may be controlled based on the determination.

FIG. 11 illustrates how a user should wear the head-mounted display device 100 according to the present disclosure. The main body 160 and the band part 170 for fixing the main body 160 to the head are shown in FIG. 11. As shown in FIG. 11(a), the band part 170 of the present disclosure includes a first band 171 and a second band 172. One end of the first band 171 and one end of the second band 172 are joined to the left and right sides of the main body 160, respectively. When the other end of the first band 171 and the other end of the second band 172 are joined to each other, the main body 160, the first band 171 and the second band 172 may form a closed loop, and the main body 160 may be fixed on the face of the user.

In conventional cases, the main body 160 is heavy and thus it is difficult to wear the head-mounted display by using an integrated band part 170 to support the main body 160. In addition, a portion for adjusting the length of the band part 170 is formed of plastics and presses the head, thereby, deteriorating wearability. As a method to address this issue in the present disclosure, the weight of the main body 160 is reduced, and both ends of the first band 171 and the second band 172 are fastened to each other.

The housing of the main body 160 is formed of a material lighter than plastics. For example, a nonwoven fabric formed by bonding a synthetic resin with an adhesive into a felt may be used. Since the main body 160 is lightweight, the main body 160 may be stably worn even when the band part 170 is won by holding only the band part 170 with both hands. In addition, since the force applied to a fastening portion for fastening the first band 171 and the second band 172 is weak, the bands may be stably fixed on the user's head without being separated.

The first band 171 and the second band 172 may have a plurality of magnets at ends thereof and the magnets of the first band 171 and the second band 172 may be coupled to each other to fix the first band 171 and the second band 172. Each magnet has a fastening force. As shown in FIG. 11(b), each magnet is pulled by the pull of the first band 171 and the second band 172 toward the center of the head when the bands are worn. Since the forces of the magnets press the head in an arcuate shape, stable coupling may be maintained even with a small force.

The number of the first magnets 173 positioned in the first band 171 may be equal to that of the second magnets 174 positioned in the second band 172. Alternatively, the number of magnets arranged on one side may be greater than that of magnets arranged on the other side. That is, extra magnets may be provided to allow the length of the bands to be adjusted according to the different sizes of heads of persons.

As shown in FIG. 5, in this embodiment, the number of magnets of the first band 171 is greater than that of magnets of the other band. The portion of the second band 172 where the second magnets 174 are disposed is shorter than the portion of the first band 171 where the first magnets 173 are disposed. The length b of the portion where the second magnets 174 are disposed in the second band 172 may correspond to the number of magnets for supporting the force required to support the main body 160, and the length a of the portion where the first magnets 173 are disposed in the first band 171 may correspond to the number of the first magnets 173 provided more than the second magnets to adjust the length according to the size of the user's head.

FIGS. 12 and 13 illustrate embodiments of first magnets positioned in a first band and second magnets positioned in a second band of the present disclosure. Each of the first magnets 173 and the second magnets 174 has a first pole and a second pole, which apply repulsive force to the same pole and attractive force to the same pole, the first magnets 173 and the second magnets 174 may be arranged such that one pole faces the corresponding band and the other pole does not touch the band.

As shown in FIG. 12(*a*), in the case where the first pole (S pole in the figure) of the first magnet 173 is arranged so as not to contact the first band 171 and the second pole (N pole in the figure) of the second magnet 174 is arranged in the second band 172 so as not to contact the second band 172, the first magnets 173 and the second magnets 174 are coupled to each such that the first magnets 173 and the second magnets 174 overlap each other in the thickness direction of the band.

In the case where the first pole (S pole in the figure) of the first magnet 173 does not contact the first band 171 and the first pole (S pole in the figure) of the second magnet 174 does not contact the second magnet 174 as shown in FIG. 12(*b*), the first magnet 173 and the second magnet 174 push each other so as not to be coupled to each other when arranged to overlap each other in the thickness direction as shown in FIG. 12 (*a*). Therefore, the magnets may be arranged in parallel in the longitudinal direction of the first band 171 and the second band 172 such that the first and second magnets are fastened to each other.

Since the first band 171 and the second band 172 are urged in opposite directions due to the weight of the main body 160, the first magnet 173 and the second magnet 174 may be fastened to each other in a hooking manner. Therefore, the first band 171 and the second band 172 may be prevented from being separated from each other by the hooks in addition to the fastening force produced by magnetism.

Next, in the embodiment of FIG. 13, the arrangement direction of the first magnets 173 is different from that of the second magnets 174. The second magnets 174 may be arranged such that only one pole engages with the second band 172 as in the embodiment of FIG. 12, the first magnets 172 may be arranged perpendicular to the second magnets 174 such that the perpendicular to the second magnet 174 So that the first pole and the second pole face the end of the band and the main body 160.

In this case, the second pole (N pole in the figure) of the first magnet 173 may be fastened to a side of the first pole (S pole in the figure) of the second magnet 174 as shown in FIG. 13, and the fastening force may be reinforced by a hooking technique as in the embodiment of FIG. 12(*b*).

FIG. 13(*b*) is a view illustrating a method of separating the first band 171 and the second band 172 of the embodiment of FIG. 13(*a*). When an end of the second band 172 is pulled to separate the first band 171 and the second band 172 from each other, the second magnet 174 is arranged in the same direction as the first magnet 173, and the second pole of the first magnet 173 and the second pole of the second magnet 174 apply repulsive force to each other, thereby facilitating the separation.

As described above, the head-mounted display device 100 of the present disclosure may be integrated with the audio output unit 152, thereby improving portability. In addition, even if the audio output unit 152 is provided, increase in size and weight may be minimized, and thus inconvenience caused by pressing the nose or the cheek when the head-mounted display device is worn may be addressed.

In addition, for the head-mounted display device 100 according to the present disclosure, whether or not the user is wearing the audio output unit 152 may be determined according to whether the audio output unit 152 is stored in the main body 160, and the head-mounted display device 100 may be controlled based on the determination. Accordingly, user convenience may be enhanced.

In addition, as the size of the headband is adjustable according to the size or shape of the user's head, and the head-mounted display device is brought into close contact with the user's face, external light may be prevented from infiltrating into the device to disturb appreciation of images. Thereby, usability may be improved.

The foregoing detailed description is to be regarded as illustrative rather than restrictive in all aspects. It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A head-mounted display device comprising:
    a main body comprising an opening formed in a rear surface thereof;
    a band part connected to the main body and fixing the main body to a head of a user;
    an image output unit disposed inside the main body to face the opening and configured to provide an image to the user;
    an earbud holder partially recessed into the main body and positioned at a corner between a side surface and a bottom surface of the main body;
    an earbud mounted on the earbud holder;
    a first sensor configured to switch to an OFF state when the earbud is stored in the earbud holder and switch to an ON state when the earbud is separated from the earbud holder;
    a second sensor configured to switch to the ON state when the main body is worn by the user on the rear surface thereof; and
    a controller configured to control the image output unit to output the image and control the earbud to output sound when both the first sensor and the second sensor are in the ON state.

2. The head-mounted display device according to claim 1, further comprising:
    a speaker mounted on the main body,
    wherein the controller is further configured to control the speaker to output sound when the first sensor is in the OFF state.

3. The head-mounted display device according to claim 1, wherein, when the first sensor is in the ON state and when the second sensor is in the OFF state, the controller provides a notification alerting to store the earbud in the earbud holder.

4. The head-mounted display device according to claim 1, wherein the earbud holder has a rear side surface extending downward so as to be inclined toward a rear side of the main body.

5. The head-mounted display device according to claim 1, further comprising:
a pair of openings formed at the corner between the side surface and bottom surface of the main body,
wherein the earbud holder is inserted into the pair of openings to cover the pair of openings, and comprises:
a data hole formed in the earbud holder; and
a data cable for connecting an external terminal and the controller through the data hole.

6. The head-mounted display device according to claim 1, wherein, when the first sensor is in the OFF state and when the second sensor is in the ON state, the controller controls the image output unit to output information indicating a storage position of the earbud.

7. The head-mounted display device according to claim 6, wherein, when the first sensor switches from the ON state to the OFF state while the image output unit is outputting the image, the controller stops outputting the image.

8. The head-mounted display device according to claim 1, further comprising:
an audio cable having one end connected to the earbud and an opposite end disposed inside the main body through a cable hole formed in the earbud holder; and
a rotary module mounted inside the main body, the audio cable being wound on the rotary module.

9. The head-mounted display device according to claim 8, wherein the rotary module comprises:
a cylindrical rotary part allowing the audio cable to be wound or unwound around or from an outer circumferential surface thereof according to a rotation direction; and
a fixing unit comprising a rotating shaft arranged through the rotary part, the fixing unit being fixed to the main body,
wherein the cable hole and a side surface of the rotary part are aligned on a straight line in a vertical direction.

10. The head-mounted display device according to claim 9, wherein an extension direction of the audio cable extending through the cable hole is coincident with an extension direction of a portion of the audio cable extending from the rotary part to the cable hole.

11. The head-mounted display device according to claim 10, wherein the fixing unit comprises:
a first fixing part positioned on one surface of the rotary part;
a second fixing part positioned on an opposite surface of the rotary part; and
a plurality of third fixing parts connecting the first fixing unit and the second fixing unit and spaced apart from a lateral surface of the rotary part,
wherein the third fixing parts are not positioned on a straight line between the rotary part and the cable hole.

12. A head-mounted display device comprising:
a main body comprising an opening formed in a rear surface thereof;
a first band and a second band connected to one end and an opposite end of the main body, respectively, and having ends fastened to each other to form a closed loop surrounding a head of a user;
an image output unit disposed inside the main body to face the opening and configured to provide an image to the user;
a plurality of first magnets arranged at a first area of the first band side by side along a longitudinal direction;
a plurality of second magnets arranged at a second area of the second band side by side along the longitudinal direction; and
a controller configured to control the image output unit,
wherein the first band and the second band are arranged to be fastened to each other such that a first pole of the first magnets and a second pole of the second magnets face each other, and
wherein a length of the first area is greater than a length of the second area.

13. The head-mounted display device according to claim 12, wherein, when the first band and the second band overlap each other, a side surface of each of the first magnets closely contacts a side surface of a corresponding one of the second magnets.

14. The head-mounted display device according to claim 12, wherein the first magnets are disposed such that the first pole faces in a direction opposite to the end of the first band, and
wherein the second magnets are disposed such that the second pole is oriented in a direction in which the second pole does not face the second band.

15. The head-mounted display device according to claim 12, wherein both ends of the main body comprise a light shielding part protruding backward and positioned on left and right sides of a face of the user,
wherein an upper portion of the rear surface of the main body is curved to have a first curvature,
wherein a lower portion of the rear surface of the main body is curved to have a second curvature larger than the first curvature.

16. A head-mounted display device comprising:
a main body comprising an opening formed in a rear surface thereof;
a band part connected to the main body and fixing the main body to a head of a user;
an image output unit disposed inside the main body to face the opening and configured to provide an image to the user;
an earbud opening partially recessed into the main body and positioned at a corner between a side surface and a bottom surface of the main body;
an earbud inserted into the earbud opening; and
a controller configured to control the image output unit and the earbud,
wherein the earbud opening has a rear side surface extending downward so as to be inclined toward a rear side of the main body.

* * * * *